United States Patent
Chen et al.

(10) Patent No.: US 9,961,019 B2
(45) Date of Patent: May 1, 2018

(54) ADAPTIVELY SWITCHED NETWORK-ON-CHIP

(71) Applicant: Intel Corporation, Santa Clara, CA (US)

(72) Inventors: Gregory K. Chen, Portland, OR (US); Mark A. Anders, Hillsboro, OR (US); Himanshu Kaul, Portland, OR (US); Ram K. Krishnamurthy, Portland, OR (US); Yejoong Kim, Ann Arbor, MI (US)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 14/579,729

(22) Filed: Dec. 22, 2014

(65) Prior Publication Data

US 2016/0182405 A1 Jun. 23, 2016

(51) Int. Cl.
*H04L 12/933* (2013.01)

(52) U.S. Cl.
CPC ................... *H04L 49/109* (2013.01)

(58) Field of Classification Search
CPC .............. H04L 49/109; H04L 47/72
USPC ........................................ 370/353
See application file for complete search history.

(56) References Cited

U.S. PATENT DOCUMENTS

| | | | | |
|---|---|---|---|---|
| 4,575,844 A * | 3/1986 | Kosuge | .................... | H04L 12/64 370/354 |
| 5,367,643 A * | 11/1994 | Chang | ....................... | G06F 5/06 370/412 |
| 8,249,063 B2 * | 8/2012 | Duan | ........................ | H04J 3/04 370/371 |
| 8,284,766 B2 | 10/2012 | Anders et al. | | |
| 8,295,176 B2 * | 10/2012 | Khasnabish | ........ | H04L 43/0817 370/232 |
| 8,670,454 B2 * | 3/2014 | Olesinski | ............ | H04L 49/3018 365/189.05 |
| 2002/0140868 A1 * | 10/2002 | Yamagata | ............ | H04N 5/4401 348/725 |
| 2003/0039237 A1 * | 2/2003 | Forslow | ................ | H04W 28/18 370/352 |
| 2010/0211720 A1 * | 8/2010 | Satpathy | .................. | G11C 7/10 710/317 |
| 2014/0119363 A1 | 5/2014 | Solihin | | |

(Continued)

FOREIGN PATENT DOCUMENTS

WO     WO 2014/209391     12/2014

OTHER PUBLICATIONS

Angelo Kuti Lusala et al., "Combining Sdm-Based Circuit Switching with Packet Switching in a NoC for Real-Time Applications", 2011 IEEE International Symposium on Circuits and Systems (ISCAS), Rio de Janeiro, May 15-18, 2011, pp. 2505-2508.

(Continued)

*Primary Examiner* — Omar J Ghowrwal
*Assistant Examiner* — Kokou R Detse
(74) *Attorney, Agent, or Firm* — Alliance IP, LLC

(57) ABSTRACT

A packet-switched reservation request to be associated with a first data stream is received. A communication mode is selected. The communication mode is to be either a circuit-switched mode or a packet-switched mode. At least a portion of the first data stream is communicated in accordance with the communication mode.

22 Claims, 8 Drawing Sheets

(56) References Cited

U.S. PATENT DOCUMENTS

| | | | |
|---|---|---|---|
| 2014/0286179 A1* | 9/2014 | Solihin | H04L 49/60 370/252 |
| 2015/0003244 A1* | 1/2015 | Hadar | H04L 12/66 370/230 |
| 2015/0071282 A1 | 3/2015 | Anders et al. | |
| 2015/0188829 A1 | 7/2015 | Satpathy et al. | |
| 2015/0220470 A1 | 8/2015 | Chen et al. | |
| 2015/0347185 A1* | 12/2015 | Holt | H04L 12/5693 718/102 |

OTHER PUBLICATIONS

Diana Gohringer, et al., "Star-Wheels Network-on-Chip Featuring a Self-Adaptive Mixed Topology and a Synergy of a Circuit- and a Packet-Switching Communication Protocol", 2009 International Conference on Field Programmable Logic and Applications (FPL 2009), Prague, Aug. 31-Sep. 2, 2009, pp. 320-325.

International Search Report and Written Opinion in International Application No. PCT/US2015/062561 dated Mar. 14, 2016.

Jen-Yu Wang, et al., "A Hybrid on-Chip Network with a Low Buffer Requirement", 2014 20th IEEE International Conference on Parallel and Distributed Systems (ICPADS), Hsinchu, Dec. 16-19, 2014, pp. 273-280.

Anders, et al., "A 2.9Tb/s 8W 64-Core Circuit-Switched Network-on-Chip in 45 nm CMOS," IEEE, 2008, 978-1-4244-2362-0/08 (pp. 182-185).

Anders et al., "A 4.1Tb/s Bisection-Bandwidth 560Gb/s/W Streaming Circuit-Switched 8x8 Mesh Network-on-Chip in 45nm CMOS," ISSCC 2010, Session 5, Processors, 5.8, Intel Corporation, IEEE International Solid-State Circuits Conference, Feb. 8, 2010, IEEE Digest of Papers, 978-1-4244-6034-2, (pp. 110-112).

Chen et al., "A 340mV-to-0.9V 20.2Tb/s Source-Synchronous Hybrid Packet/Circuit-Switched 16x16 Network-on-chip in 22nm Tri-Gate, CMOS," ISSCC 2014, Session 16/SoC Building Blocks 16.1, Intel Corporation, 2014 IEEE International Solid-State Circuits Conference, Feb. 11, 2014, IEEE Digest of Technical Papers, 978-1-4244-6034-2 (pp. 276-278).

International Preliminary Report on Patentability issued in International Application No. PCT/US2015/062561 dated Jun. 27, 2017; 6 pages.

* cited by examiner

US 9,961,019 B2

ADAPTIVELY SWITCHED NETWORK-ON-CHIP

FIELD

The present disclosure relates in general to the field of computer development, and more specifically, to an adaptively switched network-on-chip (NoC).

BACKGROUND

Networks-on-Chip (NoCs), for on-die communication between cores, are important in enabling scalable performance as the number of cores and intellectual property (IP) blocks increases in multi-core processors. In such instances, communication between components becomes the key power and performance limiter. NoCs enable efficient sharing of on-chip wiring resources for communication with routers to control and arbitrate the flow of data between communicating components. NoCs may utilize packet-switched channels or circuit-switched channels to send data between the cores of the NoC.

BRIEF DESCRIPTION OF THE DRAWINGS

Like reference numbers and designations in the various drawings indicate like elements.

DETAILED DESCRIPTION

Figure 1:
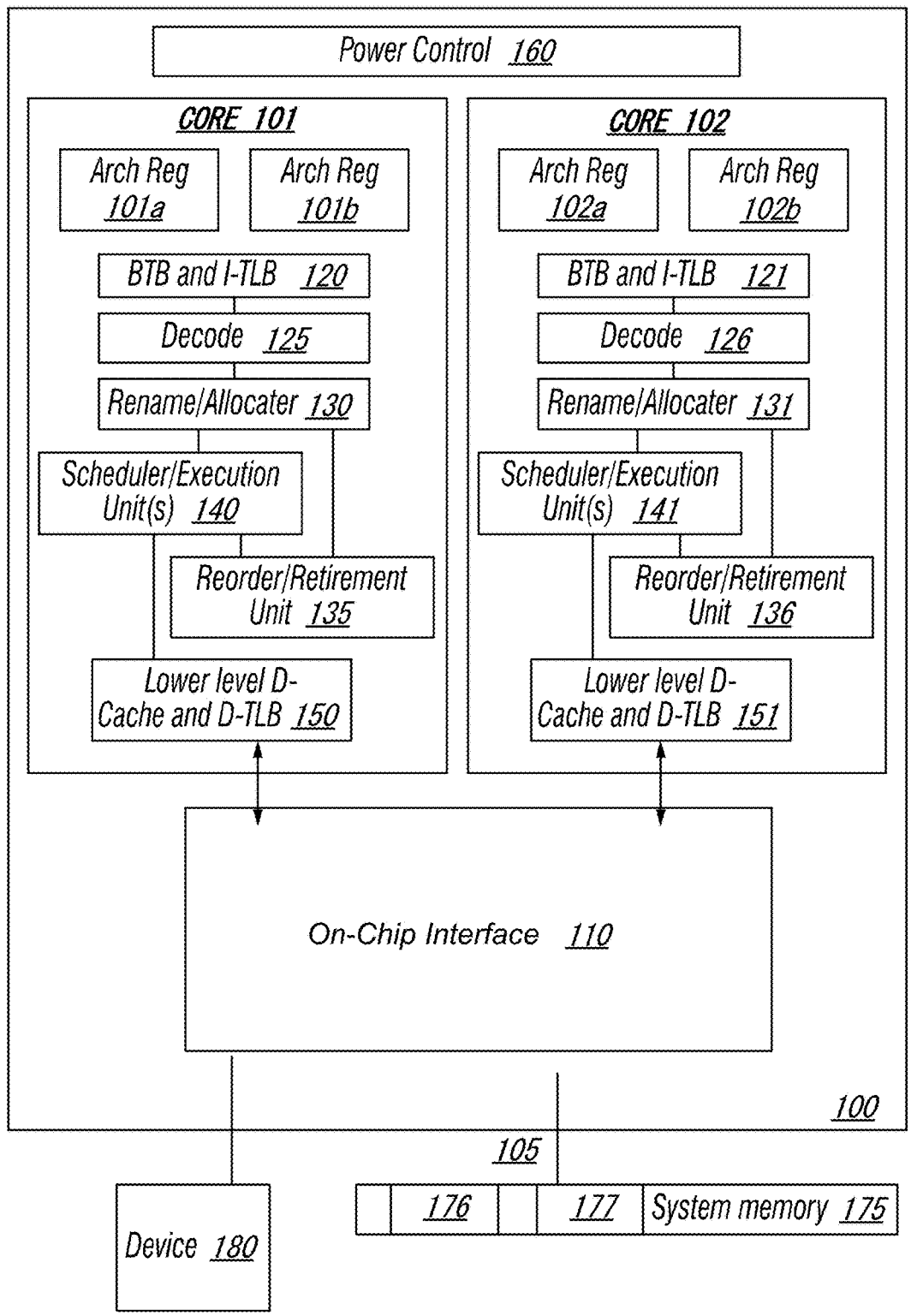
FIG. 1 illustrates a block diagram for an example computing system including a multicore processor in accordance with certain embodiments.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™, but may also be used in other devices, such as server computer systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
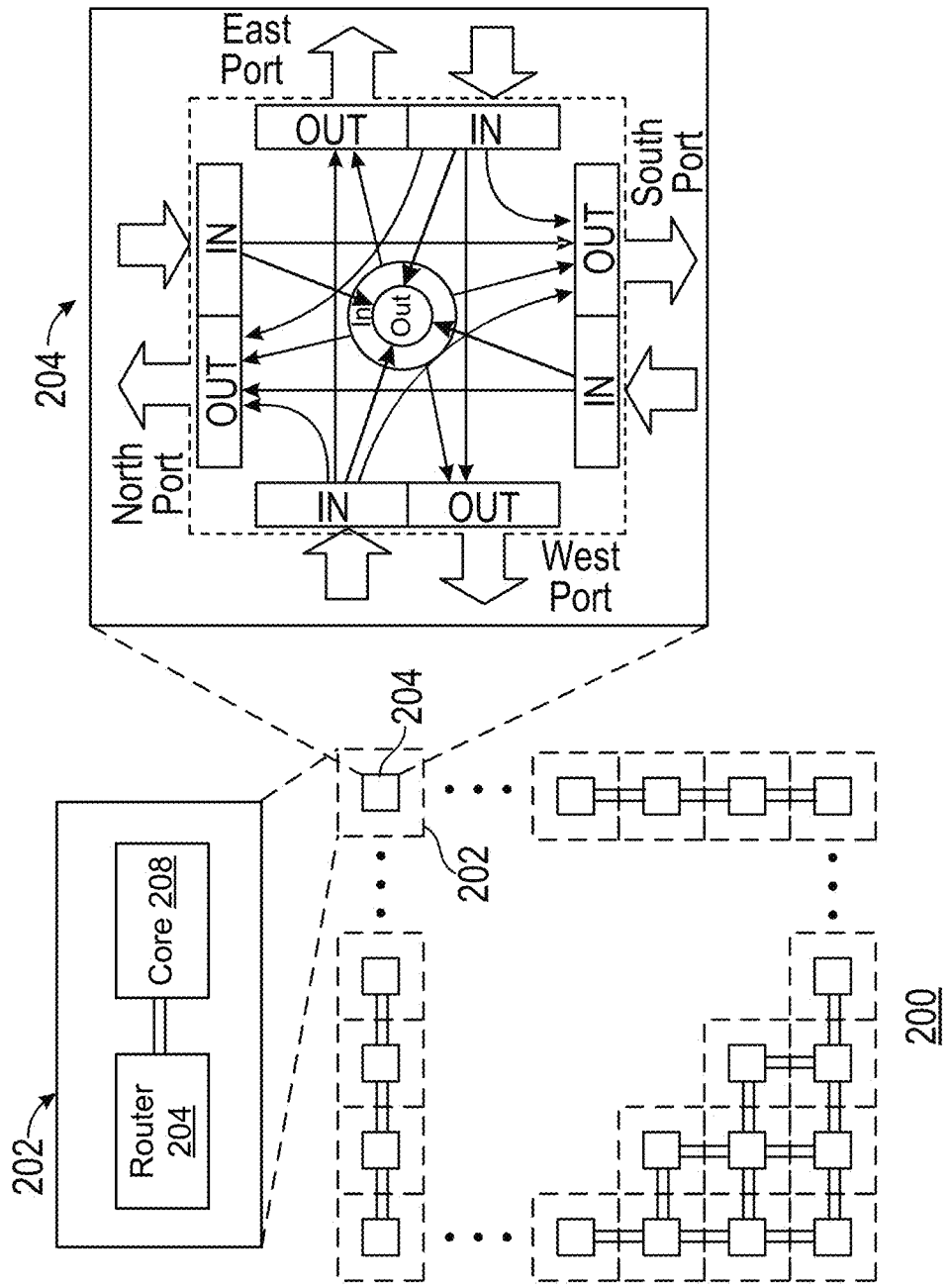
FIG. 2 illustrates a block diagram of a processor comprising a network on a chip (NoC) system including a plurality of routers in accordance with certain embodiments.

FIG. 2 illustrates a block diagram of a processor 200 comprising an NoC system including a plurality of routers 204 in accordance with certain embodiments. The processor 200 may include any processor or processing device, such as a microprocessor, an embedded processor, a digital signal processor (DSP), a network processor, a handheld processor, an application processor, a co-processor, an SoC, or other device to execute code. In particular embodiments, processor 200 is implemented on a single die.

In the embodiment depicted, processor 200 includes a plurality of network elements 202 arranged in a grid network and coupled to each other with bi-directional links. However, an NoC in accordance with various embodiments of the present disclosure may be applied to any suitable network topologies (e.g., a hierarchical network or a ring network), sizes, bus widths, and processes. Each network element 202 includes a router 204. The routers 204 may be communicatively linked with one another in a network, such as a packet-switched network and/or a circuit-switched network, thus enabling communication between components (such as cores, storage elements, or other logic blocks) of the NoC that are connected to the routers. In the embodiment depicted, each router 204 may be communicatively coupled to its own core 208 (or other logic block). As used herein, a reference to a core may also apply to other embodiments where a different logic block is used in place of a core. For example, various logic blocks may comprise a hardware accelerator (e.g., a graphics accelerator, multimedia accelerator, or video encode/decode accelerator), I/O block, memory controller, or other suitable fixed function logic. The processor 200 may include any number of processing elements that may be symmetric or asymmetric. For example, the cores 208 of processor 200 may include asymmetric cores or symmetric cores. Processor 200 may include logic to operate as either or both of a packet-switched network and a circuit-switched network to provide intra-die communication.

In particular embodiments, packets may be communicated among the various routers 204 using resources of a packet-switched network. That is, the packet-switched network may provide communication between the routers (and their associated cores). The packets may include a control portion and a data portion. The control portion may include a destination address of the packet, and the data portion may contain the specific data to be communicated on the die 100. For example, the control portion may include a destination address that corresponds to one of the network elements or cores of the die. The packet-switched network may include buffering because a dedicated path is not assured from a source to a destination and so a packet may need to be stopped temporarily if two or more packets need to traverse the same link or interconnect. As an example, the packets may be buffered (e.g., by flip flops) at each of the respective routers as the packet travels from a source to a destination. The packets may be received, transmitted and processed by the routers 204. The packet-switched network may use point-to-point communication between neighboring routers. The control portions of the packets may be transferred between routers based on a packet clock, such as a 4 GHz clock. The data portion of the packets may be transferred between routers based on a similar clock, such as a 4 GHz clock.

In an embodiment, routers of processor 200 may be variously provided in two networks or communicate in two networks, such as a packet-switched network and a circuit-switched network. Such a communication approach may be termed a hybrid packet/circuit-switched network. In such embodiments, packets may be variously communicated among the various routers 204 using resources of the packet-switched network and the circuit-switched network. In order to transmit a single data packet, the circuit-switched network may allocate an entire path, whereas the packet-switched network may allocate only a single segment (or interconnect). In some embodiments, the packet-switched network may be utilized to reserve resources of the circuit-switched network for transmission of data between routers 204.

Router 204 may include a plurality of port sets to variously couple to and communicate with adjoining network elements 202. For example, circuit-switched and packet-switched signals may be communicated through these port sets. Port sets of router 204 may be logically divided, for example, according to the direction of adjoining network elements and/or the direction of traffic exchanges with such elements. For example, router 204 may include a north port set with input ("IN") and output ("OUT") ports configured to (respectively) receive communications from and send communications to a network element 202 located in a "north" direction with respect to router 204. Additionally or alternatively, router 204 may include similar port sets to interface with network elements located to the south, west, east, or other direction. In the embodiment depicted, router 204 is configured for X first, Y second routing wherein data moves first in the East/West direction and then in the North/South direction. In other embodiments, any suitable routing scheme may be used.

In various embodiments, router 204 further comprises another port set comprising an input port and an output port configured to receive and send (respectively) communications from and to another agent of the network. In the embodiment depicted, this port set is shown at the center of router 204. In one embodiment, these ports are for communications with logic that is adjacent to, is in communication with, or is otherwise associated with router 204, such as processor logic of a "local" core 208. Herein, this port set will be referred to as a "core port set," though it may interface with logic other than a core in some implementations. In another embodiment, this port set is for communications with a network element which is in a next level of a network hierarchy higher than that of router 204. In one embodiment, the east and west directional links are on one metal layer, the north and south directional links on a second metal layer, and the core links on a third metal layer. In an embodiment, router 204 includes crossbar switching and arbitration logic to provide the paths of inter-port communication such as that shown in FIG. 2. Logic (such as core 208) in each network element may have a unique clock and/or voltage or may share a clock and/or voltage with one or more other components of the NoC.

Traffic congestion in NoCs limits throughput and increases data transfer latency. Packet-switching provides low-latency and high throughput, but it requires storage elements (e.g., flip-flops) in each port thus consuming high power. Circuit-switching, on the other hand, does not require the storage elements and is energy-efficient, however, its latency and throughput is worse than packet-switching in congested networks. In circuit-switched networks, allocated circuit-switched resources, as well as active data transfers, block other transfers that are competing for the same network resources. Circuit-switched or packet-switched flow controls are typically implemented globally and statically with no ability to adjust for changing traffic conditions. That is, channels in existing NoCs are either packet-switched or circuit-switched, and the NoCs lack the ability to flexibly adjust the switching mode of these channels depending on traffic patterns. This leads to both traffic hot-spots and overprovisioning of idle resources in different regions of the NoC.

In various embodiments of the present disclosure, the NoC adaptively changes its flow control method based on the current traffic conditions. For example, when there is one active data stream or no active data streams in a router port, the port may operate in a circuit-switched mode (e.g., the port may transfer data in a circuit-switched channel) to save energy. If there are multiple data streams coming into the port, the port may operate in a packet-switched mode (e.g., the port may perform credit-2 packet switching transfers) to alleviate congestion and serve multiple data streams. Each port may operate independently to change flow-control modes based on local and temporal traffic congestion.

Various embodiments of the present disclosure may include a network similar to a hybrid packet/circuit-switched network wherein the circuit-switched portion of the network is replaced by a network having channels that may be adaptively switched between circuit-switched and packet-switched modes based on traffic congestion. Thus, in some embodiments, a packet-switched network may reserve resources for transmission of data between routers 204 and an adaptively switched network may allow the data to be passed between routers using circuit-switched channels or packet-switched channels. The adaptively switched network is described in greater detail below.

Figure 3A:
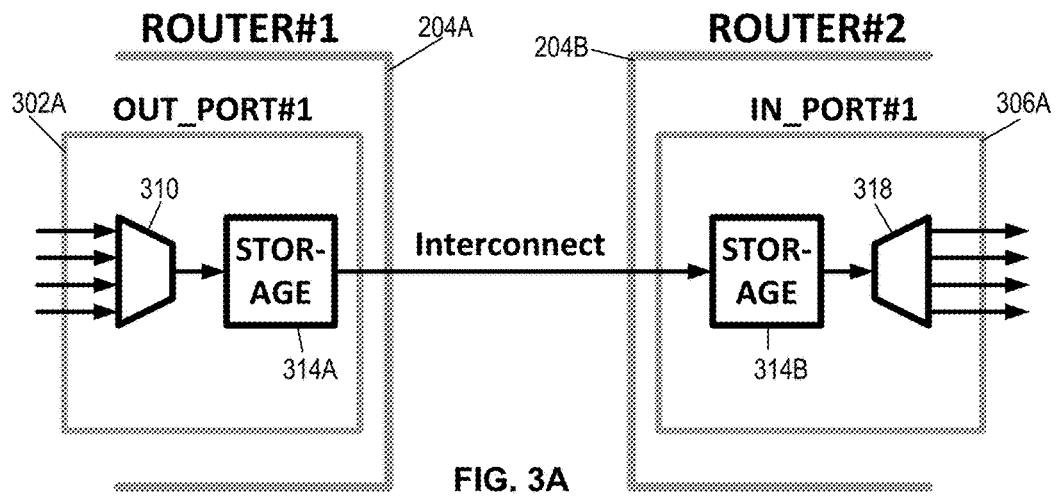
FIG. 3A illustrates example router ports coupled via a packet-switched channel in accordance with certain embodiments.

FIG. 3A illustrates example router ports 204A and 204B coupled via a packet-switched channel in accordance with certain embodiments. In a packet-switched NoC, either one or both of output port 302A and input port 306A includes storage elements 314 (e.g., flip flops). In the embodiment depicted, both output port 302A and input port 306A include storage elements 314. Whenever new data arrives at output port 302A of router 204A from an input port of router 204A (mux 310 may select the new data from packets of data that arrive from multiple different input ports of router 204A), the data is temporarily stored in storage element 314A until it is allowed to proceed to router 204B. At router 204B, the data is stored by storage element 314B and then broadcast or demultiplexed to the output ports of router 204B on its way to the next router in the path to the destination of the data. Data storage provides good latency and throughput by pipelining, but requires higher clock and data power.

Figure 3B:
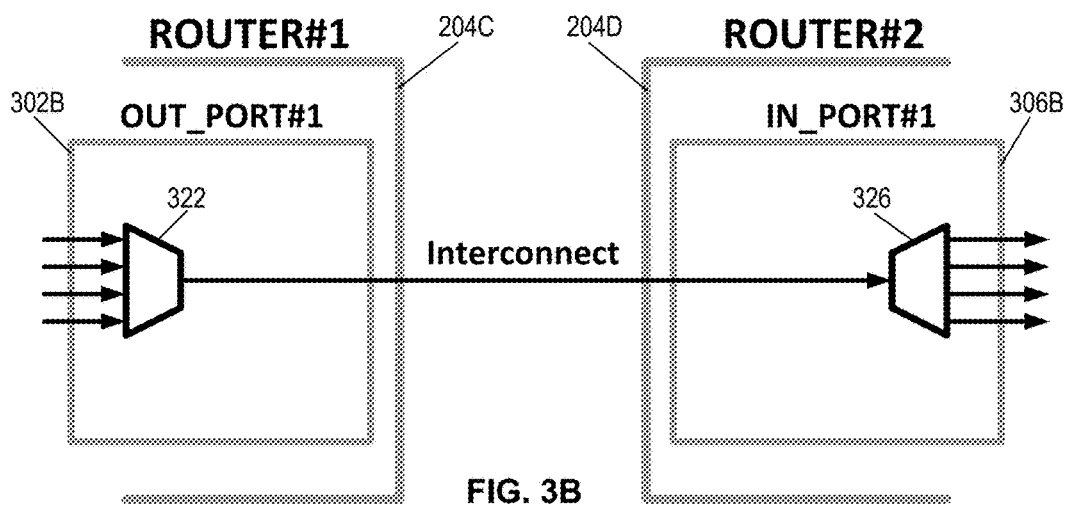
FIG. 3B illustrates example router ports coupled via a circuit-switched channel in accordance with certain embodiments.

FIG. 3B illustrates example router ports 204C and 204D coupled via a circuit-switched channel in accordance with certain embodiments. Circuit switching achieves higher energy efficiency by eliminating data storage power in the routers 204. This includes reducing clock power and data switching power. In circuit-switched NoCs, data is transmitted on circuit-switched channels that are reserved from source to destination core and transferred through various multiplexers (e.g, mux 322) and demultiplexers (e.g., demux 326). In hybrid packet/circuit-switched networks, these channels are set up using packets. The packets store a small amount of direction information in each router to control the route of the circuit-switched channel. Once the circuit-switched channel is set up, data is streamed across the channel. After data transfer, the channel is deallocated to allow subsequent data transfers. In both packet-switched and circuit-switched networks, active data transfers block other transfers competing for the same network resources. In addition, in circuit-switched networks, allocated circuit-switched channels block other transfers, even if the channel setup is not complete and no data is actively being transferred on the channel. Optimal circuit-switched resource utilization and transfer ordering to minimize congestion requires global traffic information which is not practical to obtain in low-latency systems.

Figure 3C:
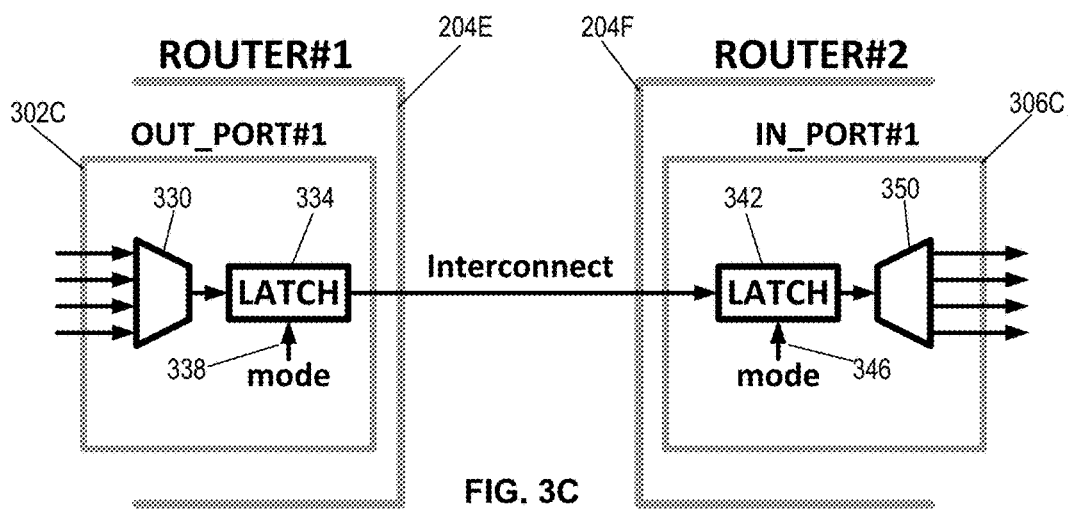
FIG. 3C illustrates example router ports coupled via a channel that may be adaptively switched between a packet-switched channel and a circuit-switched channel in accordance with certain embodiments.

FIG. 3C illustrates example router ports 204E and 204F coupled via a channel that may be adaptively switched between a packet-switched channel and a circuit-switched channel in accordance with certain embodiments. Each port 302C and 306C includes storage elements (e.g., latches 334 and 342 or flip flops) to store data passed between the ports. These storage elements operate conditionally based on mode signals 338 and 346. If a port is in circuit-switched mode, then the respective storage element stays open without consuming dynamic power. In the circuit-switched mode, the port energy efficiency approaches that of a circuit-switched NoC. In particular embodiments, if there are multiple active streams at the same port, the mode may be changed to a packet-switched mode. In this mode, the ports will clock the storage elements to pipeline the data transfer, in a manner similar to that of a packet-switched NoC. The mode change is limited to the local region where multiple streams arrive at one port. Other parts of the NoC, where there is less traffic, may remain in the circuit-switched mode for high energy efficiency.

In various embodiments, an adaptive NoC may comprise an NoC comprising routers that are each operable to adaptively switch between packet-switched communication and circuit-switched communication over the same channel. In some embodiments, each port of multiple ports of a router of an NoC is operable to adaptively switch between packet-switched communication and circuit-switched communication. Each port may determine independently whether it is to operate in a packet-switched mode or circuit-switched mode based on the number of active streams received at the port. Thus, for a particular data transfer across a path between source logic and destination logic, one or more routers in the path may transfer the data in a circuit-switched mode while one or more routers may transfer the data in a packet-switched mode.

Figure 4:
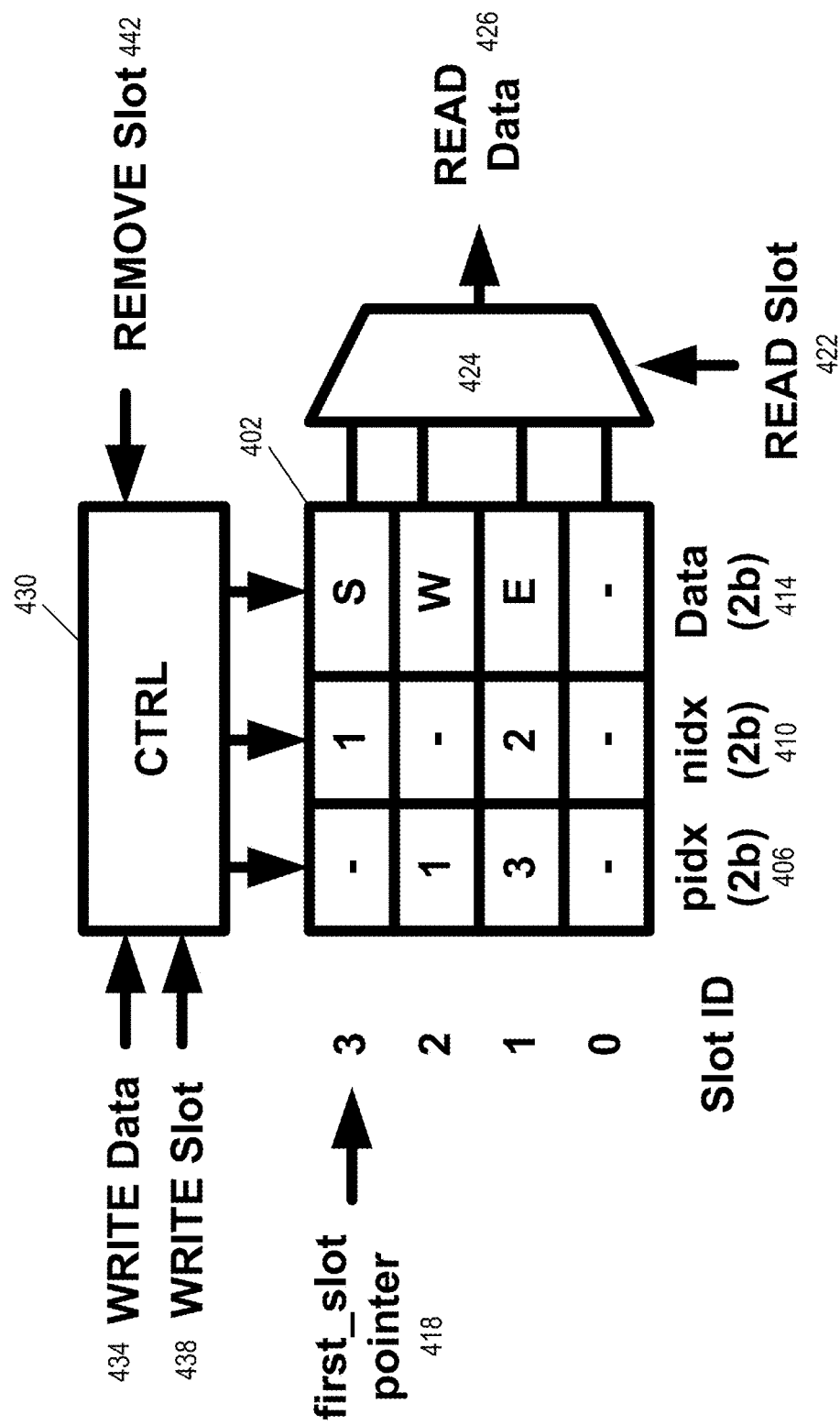
FIG. 4 illustrates example linked list logic of a router port in accordance with certain embodiments.

FIG. 4 illustrates example linked list logic 400 of a router port in accordance with certain embodiments. In a particular embodiment, the linked list logic 400 is implemented as a hardware linked list. In other embodiments, the linked list logic 400 may be implemented in any suitable manner, such as software or firmware.

Each entry in linked list 402 includes a previous index field (pidx 406), a next index field (nidx 410), and a data field (data 414). The pidx 406 of an entry points to the slot of the entry that was placed in the linked list previous to the entry. The nidx 410 of an entry points to the slot of the next entry that was placed in the linked list after the entry. Data 414 may indicate a direction associated with the transfer corresponding to the entry. In an output port, data 414 may represent which input port of the router the data is to be received (this enables control signals to be configured so that communication may take place between the output port and the proper input). In an input port of a router, data 414 may represent the output port of the router that data is to be sent to (this enables the proper control signal configuration). The first slot pointer 418 may point to the head of the linked list (e.g., this may be the transfer that is processed during circuit-switched mode).

In particular embodiments, the linked list 402 is implemented as an array. The entries may be physically stored in any order, but the linked list 402 allows the router port to track the order of the data transfers represented by each entry. In circuit-switched mode, data transfers may be processed in the order they arrive. For example, the head of the linked list 402 may control the circuit-switched channel. In packet-switched mode, the entries in the linked list 402 may be cycled through (i.e., you can interleave various data transfers). For example, in one embodiment, if a data transfer has multiple streams that need to go from source logic to destination logic, one or more transfers from the stream may pass through the port as one or more packets and then the port may send one or more transfers of a different stream as one or more packets. The port might then go back to sending transfers from the original stream or send transfers from an entirely different stream. The pointers of the entries (pidx 406 and nidx 410) allow the routers to correctly cycle through active channels, with channels being formed and deallocated in an unknown order because of varying stream lengths. A global order is required so that each router knows which transfer is being processed without having to communicate this information between routers. In particular embodiments, an output port of a first router and an input port (coupled to the output port of the first router) of a second router have synchronized linked lists 402. That is, data related to a particular transfer will occupy the same slot in each linked list. For example, if the depicted linked list 402 is at an output port of a router, a linked list at a corresponding input port of a second router may include identical data in the pidx 406 and nidx 410 fields (though the direction data 414 may be different).

The number of entries in a linked list 402 indicates how many active streams have arrived at the port. In particular embodiments, the number of entries in linked list 402 determine whether the port operates in a circuit-switched mode or a packet-switched mode. For example, if there are two or more entries in the linked list 402, the port will operate in packet-switched mode, but will otherwise operate in circuit-switched mode. In other embodiments, other suitable thresholds (such as three or more entries) could be used to determine when the port should switch from circuit-switched mode to packet-switched mode.

Linked list logic 400 further includes control logic 430 operable to receive a write data signal 434, a write slot signal 438, and a remove slot signal 442. The control logic 430 uses these signals to add, remove, and modify entries in the linked list 402. Write slot 438 is computed by the logic (not shown) of the linked list logic 400 and indicates a slot of the linked list 402 that should receive the write data 434 into the data 414 field. The write data signal 434 may be derived from a reservation request packet (e.g., direction logic may determine the direction data based on information such as a destination address contained in the reservation request packet) that is received by a packet-switched portion of the port. The remove slot signal 442 may be derived from a circuit-switched data transfer (e.g., the end of a data stream generates the remove slot signal to remove its associated direction information from the linked list 402) that is received by a circuit-switched portion of the port.

In the diagram shown, the next write slot signal 438 would be 0, since that is the next slot that should be written to. When slot 0 is written to, the nidx 410 of slot 2 would be updated to 0 and the pidx of slot 0 would be updated to 2. The remove slot signal 442 indicates a slot of the linked list 402 for which the entry should be removed. Linked list 402 is coupled to a multiplexer 424 that outputs read data 426 based on a read slot control signal 422. The read slot control signal 422 indicates one of the slots of linked list 402 and the read data 426 is the data 414 from the indicated slot.

Figure 5:
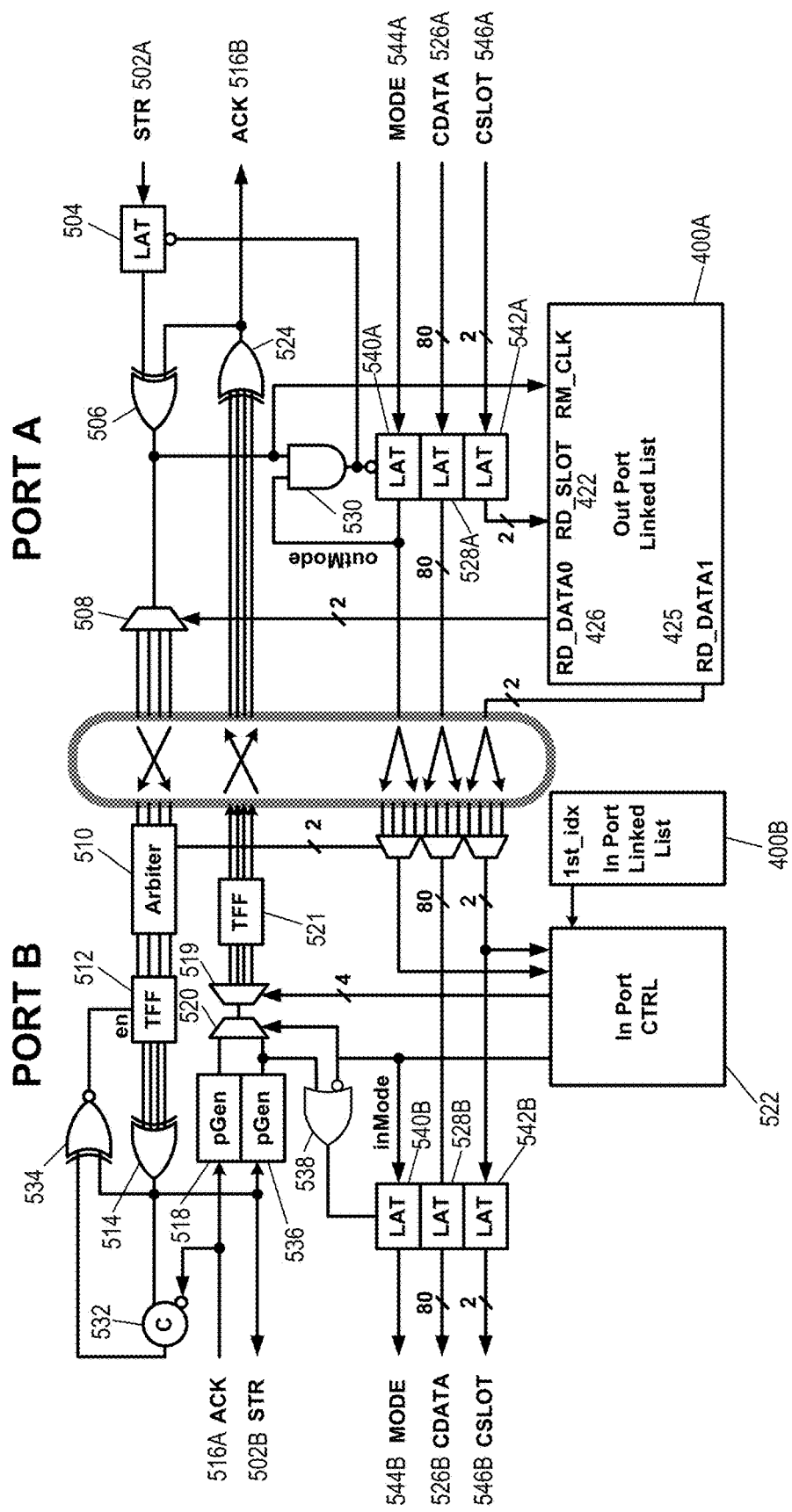
FIG. 5 illustrates example ports of a router having adaptively switched channels in accordance with certain embodiments.

FIG. 5 illustrates example ports of a router having adaptively switched channels in accordance with certain embodiments. The embodiment depicted assumes a router with five port sets (each port set being logically subdivided into an input port and an output port), though any number of port sets may be used in other embodiments. In the embodiment depicted, the ports are labeled port A and port B, instead of input port and output port because the circuit-switched data may flow in either direction with respect to the direction of the reservation packet depending on whether the reservation packet is request to read from or write to the destination logic. In the embodiment depicted, circuit-switched data may go from port A to port B and the corresponding packet-based reservation request may go from port B to port A via packet-switched portions of these ports (not shown). Thus port B is the input port with respect to the reservation request, but is the output port with respect to the circuit-switched data transfer. Similarly, port A is the output port with respect to the reservation request, but is the input port with respect to the circuit-switched data transfer. The gray area in the figure represents a crossbar within a router.

The source-synchronous clock stream (str) signal 502A propagates along with each data transfer and clocks data in the destination core. The data transfer is acknowledged with the ack signal 516A. Both str and ack are edge-encoded on the links and converted to a level-sensitive signal within the routers for multiplexing and de-multiplexing. Data (cdata 526A) travels through the router crossbar and latches which are conditionally clocked based on the port mode (mode 544A) which may be a logic "0" for circuit-switched mode and a logic "1" for packet-switched mode in the embodiment depicted. The cslot signal 546A refers to which transfer is being processed. The various signals and components of the ports will be described with respect to the circuit-switched mode first and then the packet-switched mode.

In the circuit-switched mode, stream (str) signal 502A passes through latch 504 (which remains open in the circuit-switched mode) and XOR gate 506. Str 502A is transition encoded when passing between routers and XOR gate 506 converts str 502A into a level sensitive signal which is then fed to demultiplexer 508. Based on the selection signal received from linked list 400A, demultiplexer 508 sends str 502A to one of the port Bs of the router.

Arbiter 510 of port B receives a str signal from each port A and chooses one of the str signals based on arrival order. The str signal that is output from the arbiter is then converted from a level sensitive signal back to a transition encoded signal by a toggle flip flop 512. The edges output by the toggle flip flops 512 are combined by XOR gate 514 and then sends the resulting signal str 502B out through port B. Particular embodiments may also include a tail signal that is processed in a manner similar to that shown for the str signal. In various embodiments, str and tail signals may both designate a data transfer. The str signal indicates communication of circuit data with more data to follow (as additional segments) and thus keeps the circuit channel open for a complete circuit data transfer (of one or more segments) and the tail signal indicates an end of a circuit data transfer.

Acknowledge (ack) signal 516A is a reverse direction signal that indicates that the data has arrived at the destination core. In various embodiments, ack signal 516A may be sent for each segment of a circuit-switched data transfer received at destination logic. Ack 516A is fed through pulse generator (pGen) 518 (which generates a rising and falling edge) to multiplexer 520. In port ctrl logic 522 provides the inMode signal which configures the multiplexer 520 to pass ack 516A to demultiplexer 519. In port ctrl logic 522 also provides a control signal to demultiplexer 519 to pass this signal to the correct port A. The output of the demultiplexer 519 passes through the corresponding toggle flip flop of toggle flip flops 521 and back to the port A that sent the corresponding str signal. The toggle flip flop that receives ack 516A converts it back to an edge. Ack 516A is then sent to the correct port A where it is combined with other signal lines that may carry ack signals at XOR gate 524 and then exits port A as ack signal 516B. The other branch of the output of XOR gate 524 goes through XOR gate 506 to turn off the output of XOR gate 506 caused by str 502A.

Circuit-switched data 526A passes through latch 528A (which remains open while port A is in circuit-switched mode) and is broadcast to each port B. Port B may receive circuit-switched data from each port A and select between them based on the output of arbiter 510. The selected circuit-switched data is sent through latch 528B (which also remains open while port B is in circuit-switched mode) to the output of port B. Latches 528A and 528B correspond to latches 342 and 334 of FIG. 3C.

In the packet-switched mode, str signal 502A passes through latch 504 (which is initially open in the packet-switched mode) and XOR gate 506. The output of the XOR gate 506 will propagate through AND gate 530 and will close latches 504 and 528A (and latches 540A and 542A) to block off any additional str signals and cdata signals from propagating until the current data transfer is finished. Str 502A is transition encoded when passing between routers and XOR gate 506 converts str 502A into a level sensitive signal which is then fed to demultiplexer 508. Based on the selection signal received from linked list 400A, demultiplexer 508 sends str 502A to one of the port Bs. Arbiter 510 of port B receives a str signal from each port A and chooses one of the str signals based on arrival order. The str signal that is output from the arbiter is then converted from a level sensitive signal back to a transition encoded signal by a toggle flip flop 512. The edges output by the toggle flip flops 512 are combined by XOR gate 514 and the resulting resulting signal str 502B is sent out through port B.

In the packet-switched mode, the str signal output by XOR gate 514 also passes through credit tracking logic comprising C element 532 and XNOR gate 534. After two consecutive str signals have been received at the credit tracking logic, the enable signal to toggle flip flops 512 will be disabled, blocking further data transfers until an ack signal 516A arrives. In addition to being passed to the credit tracking logic, the output of XOR gate 514 is also passed to pulse generator 536, through a transition gate 538 selected by the in port ctrl logic 522, through a toggle flip flop 521, and back to port A where this signal functions as an acknowledge signal for the data transfer. The output of pulse generator 536 is also passed through OR gate 538, and the output of the OR gate 538 controls latches 528B, 540B, and 542B to latch cdata (which may be selected from cdata from multiple port As based on the output of arbiter 510), mode, and cslot signals respectively. This allows the latches to send out the mode 544B, cdata 526B, and cslot 546B signals (when the str 502B signal is sent) to another router. When the ack signal 516A is received, it is not propagated through pulse generator 518, multiplexer 520, demultiplexer 519, and toggle flip flop 521, but rather is passed to the credit tracking logic where it restores credit and turns toggle flip flop 512 back on to allow an additional transfer.

The mode signal 544A (which is a logic "0" during circuit-switched mode and a logic "1" during packet-switched mode) enters port A and is propagated to AND gate 530 and allows the latches 540A, 528A, and 542A to be closed by the str signal 502A during packet-switched mode. The mode signal 544A is broadcast to each port B. Port B selects a mode signal from the appropriate port A using the output of arbiter 510. The selected mode signal is then passed to the in port ctrl logic 522. In port ctrl logic 522 uses the information in the in port linked list 400B to send the inMode signal to latch 540B and OR gate 538. In port ctrl logic 522 determines the switching mode (inMode) based on the number of entries in the in port linked list 400B. In port ctrl logic 522 also sends the inMode signal to multiplexer 520 to select between the ack and str signals and a control signal to configure demultiplexer 519 to send the ack or str signal to the correct port A.

The cslot signal 546A passes through latch 542A and into the out port linked list 400A. The cslot signal 546A indicates which data transfer is currently being performed. In the packet-switched mode, cslot signal 546A is used to send the rd_data1 signal 425 (the slot ID of the out port linked list 400A which identifies which transfer is occurring, this is the same slot identified by rd_slot 422) to each port B. Port B selects the appropriate rd_data1 signal using the output of arbiter 510 and this signal is propagated through latch 542B to the output of port B and is also used to keep track of which element is being added or removed from in port linked list 400B.

Various embodiments above illustrate ports with adaptively switched channels in the context of source-synchronous NoCs. In source-synchronous NoCs, control signal transitions (e.g., the stream and tail signals) forwarded along with the data act as clock signals, thus eliminating the need for a fully-synchronous clock. This technique facilitates multi-clock designs (wherein cores associated with different routers may operate at different frequencies) by removing the need for synchronizing data FIFOs at each router. However, the illustrated embodiments can be easily adapted to work with fully-synchronous NoCs with explicit clocks and level sensitive control signals. A synchronous packet-switched NoC may comprise routers that communicate with their neighbors based on a global clock. Thus, all the routers in a synchronous NoC operate at the same frequency. In various synchronous implementations, no explicit credit tracking circuits are required since the placement of flip-flops and latches along with grant and request based clock-gating of storage elements may achieve the same result. The clock for the circuit-switched network may be derived from the clock for the packet-switched network and may be a multiple of the clock of the packet-switched network to account for the worst-case circuit-switched channel setup.

Figure 6:
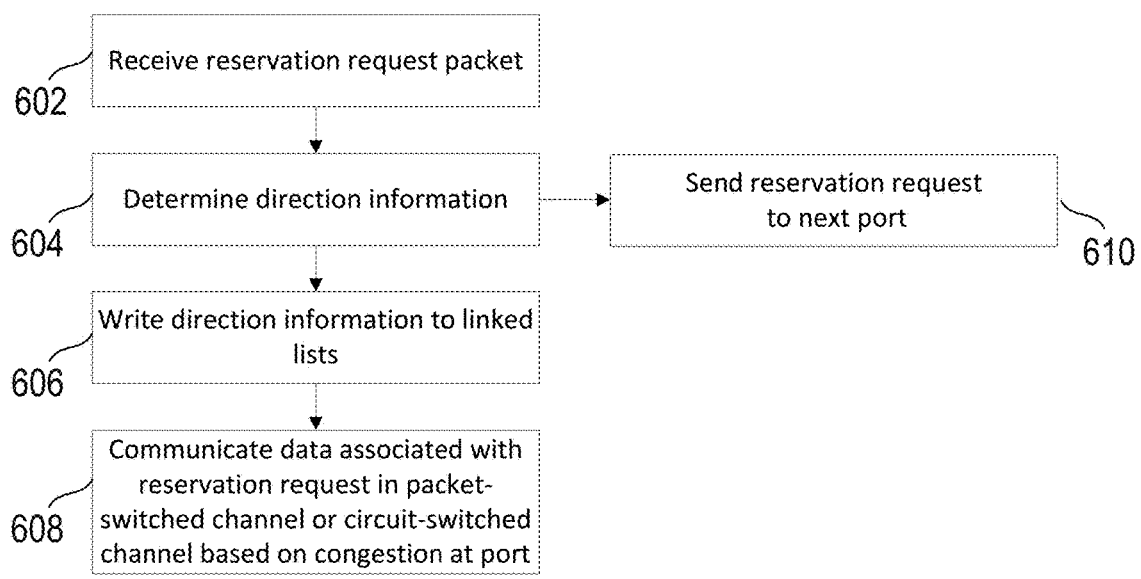
FIG. 6 illustrates an example method for reserving resources for and communicating data by a router through an adaptively switched channel in accordance with certain embodiments.

FIG. 6 illustrates an example method for reserving resources for and communicating data by a router through an adaptively switched channel in accordance with certain embodiments. At step 602, a reservation request packet is received via a packet-switched portion of the router. A request packet may establish a channel between source logic located at a network element 202 and destination logic located at a different network element. To begin a data transfer, the source logic sends a reservation packet toward the destination logic. This reservation packet may be communicated via a packet-switched portion of the NoC and may reserve resources for circuit-switched data or packet-switched data communication between source logic and destination logic as the reservation packet travels from the source to the destination. The reservation packet may include any suitable information facilitating the reservation of the data channel. As an example, the reservation packet may include an address (i.e., the address associated with the destination) and optional sideband packet data.

At step 604, direction information associated with the reservation request is determined. For example, at in input port, the output port that the reservation request should be forwarded to is determined. In particular embodiments, the direction information is based on a deterministic routing method (e.g., X-first, Y-second routing or a table lookup) or other routing protocol (e.g., a source structured protocol where the reservation packet includes the directions the packet should travel at each router) performed by a direction decoder in the given router. In an embodiment, a unique address may be associated with each core 208 or other logic block (and thus router 204 in cases where there is a 1:1 mapping between cores and routers). In turn, this local address may be used to generate direction information local to each router to identify the appropriate port of the router for sending the information. Thus, the address in the packet may be used in conjunction with the local address of the router 204 to determine which direction to forward an incoming packet. In some embodiments, the direction information determined at step 604 may include an outgoing direction for an input port (e.g., an identifier of the output port the reservation request should be sent to) and an incoming direction (e.g., an identifier of the input port the reservation was received from).

At step 610, the packet is forwarded downstream along a path from the source logic to the destination logic based on the determined direction information when resources are available. In various embodiments, step 610 may be performed in parallel with steps 606 and 608. In various embodiments, a router 204 may use a credit system to allow multiple reservation requests to be sent from one port before the first request is serviced. As an example, an output port may operate in accordance with a credit-2 packet system, wherein the number of sent requests from the output port can exceed the number of received grants by two, while an input port may operate in accordance with a credit-1 packet system, wherein the input port may not send additional requests until a grant is received. However, any suitable credit system may be used at either port.

At step 606, the direction information is written to linked lists of the router. For example, direction information associated with the input port may be written to a linked list associated with the input port while direction information associated with the output port may be written to a linked list associated with the output port.

At step 608, once resources are available to transfer data associated with the reservation request, the data is communicated using a packet-switched channel or a circuit-switched channel depending on the congestion at a port of the router that is to communicate the data. This step will be described in further detail in connection with FIG. 7.

Some of the steps illustrated in FIG. 6 may be repeated, combined, modified or deleted where appropriate, and additional steps may also be added to the flowchart. Additionally, steps may be performed in any suitable order without departing from the scope of particular embodiments.

Figure 7:
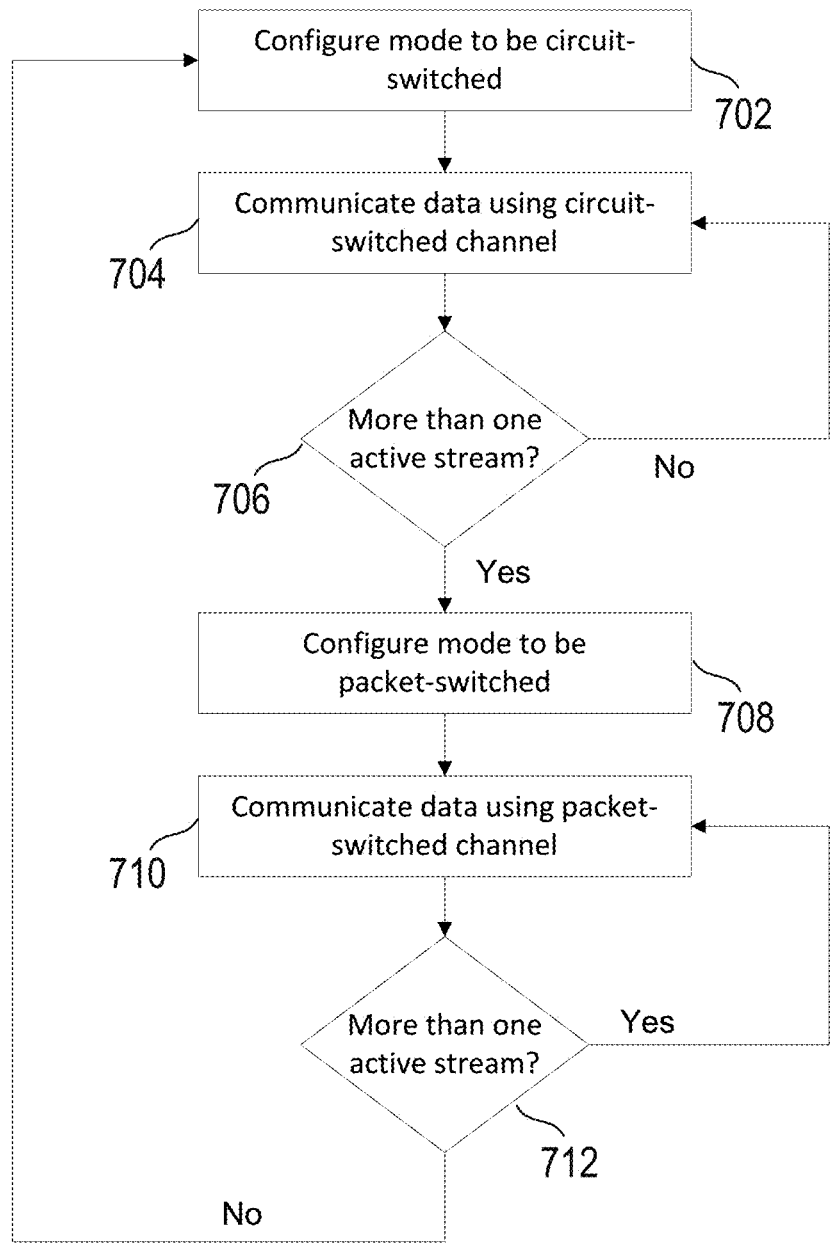
FIG. 7 illustrates an example method for communicating data via an adaptively switched channel of a router in accordance with certain embodiments.

FIG. 7 illustrates an example method for communicating data via an adaptively switched channel of a router in accordance with certain embodiments. At step 702, a port is configured to communicate in a circuit-switched mode. For example, a mode signal that is sent to various components of the port may be set to a logic value that corresponds to the circuit-switched mode. In the circuit-switched mode, one or more storage elements (e.g., latches) of the port may remain in an open state to transparently pass data while consuming only a nominal amount of power. A corresponding mode signal may also be set to circuit-switched mode at a port of another router that communicates with the port. At step 704, data is communicated via a circuit-switched channel from the port to another port. Because the storage elements in the ports are open, the circuit-switched channel does not buffer the data as it travels from one port to another.

At step 706, it is determined whether there is more than one active data stream at the port. If there is only one active data stream (or no active streams) at the port, the port remains in circuit-switched mode. The port continues to communicate data streams it receives across the circuit-switched channel until it detects that there is more than one active stream at step 706 at which point the method moves to step 708. The port may determine there is more than one active stream in any suitable manner. For example, the number of entries in a linked list of the port may be detected, where each entry corresponds to an active data stream.

At step 708, the mode is configured to be packet-switched. For example, a mode signal that is sent to various components of the port may be set to a logic value that corresponds to the packet-switched mode. In the packet-switched mode, one or more storage elements (e.g., latches) of the port may move to a state in which they may be clocked to open and closed, thus enabling the storage of data during communication of the data between ports. A corresponding mode signal may also be set to packet-switched mode at a port of another router that communicates with the port. At step 710, data is communicated from the port using a packet-switched channel. In particular embodiments, the port may switch between multiple active data streams as it communicates data in a packet-switched mode via the use of a linked list in the port.

At step 712, it is again determined whether there is more than one active data stream at the port. If there is still more than one active data stream at the port, the port remains in a packet-switched mode. The port continues to communicate data streams it receives across the packet-switched channel at step 710 until it detects that there is only one active stream (or no active streams) at step 712 at which point the method moves back to step 702 where the mode is switched back to circuit-switched.

Some of the steps illustrated in FIG. 7 may be repeated, combined, modified or deleted where appropriate, and additional steps may also be added to the flowchart. Additionally, steps may be performed in any suitable order without departing from the scope of particular embodiments.

In various embodiments, an adaptively switched NoC may include a slight latency penalty to propagate through the latch in each port. However, this latency is more than compensated for through pipelining, decreasing fall-through latency with random uniform traffic by 5.1× in one embodiment when compared to a baseline hybrid packet/circuit-switched NoC. Adaptive flow control also increases throughput by 1.9× and 2.3× in some embodiments with linked lists of depth 4 and 8.

As the data stream length increases, adaptive flow control allows more opportunities for pipelining. With only one transfer per data stream, the proposed flow control improves throughput by 1.4× in one embodiment. However, as data stream length increases to 10 transfers, an embodiment may experience a 9.1× increase in throughput.

The energy consumption of the NoC closely tracks its operation mode. An embodiment of a packet-switched network is estimated to have 36% higher energy consumption. With adaptive flow control, in one embodiment, 47% of hops are in packet-switched mode under the same traffic conditions and with the same NoC topology. This corresponds to only an 18% increase in energy in one embodiment.

Figure 8:
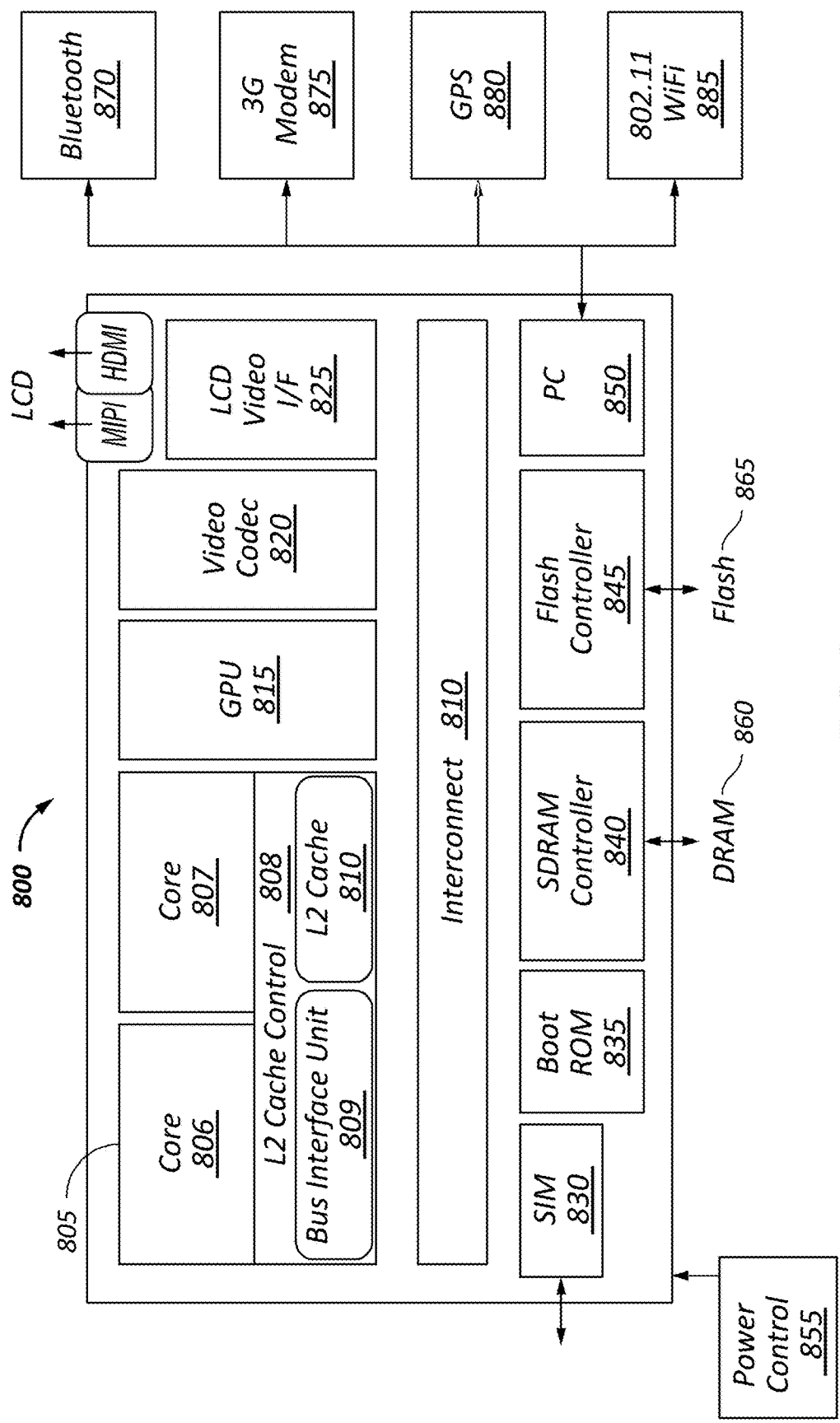
FIG. 8 illustrates another block diagram for an example computing system in accordance with certain embodiments.

FIG. 8 illustrates another embodiment of a block diagram for an example computing system in accordance with one embodiment. In this figure, an embodiment of a system on-chip (SOC) design in accordance with the disclosures is depicted. As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 810 includes an on-chip interconnect, such as an IOSF, AMBA, or other interconnect discussed above, which potentially implements one or more aspects of the described disclosure.

Interface 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control Q1650 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the disclosure described herein.

In addition, the system illustrates peripherals for communication, such as a Bluetooth module 870, 3G modem 875, GPS 885, and WiFi 885. Note as stated above, a UE includes a radio for communication. As a result, these peripheral communication modules are not all required. However, in a UE some form a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, a machine readable storage, a machine readable medium, hardware- and/or software-based logic (e.g., a first router of a network on chip), a method, and a non-transitory machine readable medium including information to represent structures (when manufactured, to be configured) to comprise an input port to receive a packet-switched channel reservation to reserve communication resources for a first data stream; logic to determine a mode of a channel, the mode to be either a circuit-switched mode or a packet-switched mode; a storage element that is to pass data at an input of the storage element to an output of the storage element without storing the data when the channel is in the circuit-switched mode and store data at the input of the storage element when a clock signal is received when the channel is in the packet-switched mode. The storage element is to receive data of the first data stream at the input of the storage element.

In at least one example, the apparatus is a processor.

In at least one example, the storage element is associated with the input port.

In at least one example, the first router is to further comprise an output port and wherein the storage element is associated with the output port.

In at least one example, the storage element is to comprise at least one data latch.

In at least one example, the first router is to further comprise a linked list, an entry of the linked list to correspond to the first data stream.

In at least one example, the linked list is to further comprise a second entry to correspond to a second data stream.

In at least one example, the first router is to further comprise an output port to utilize the linked list to alternate between providing data from the first data stream to the input of the storage element and providing data from the second data stream to the input of the storage element.

In at least one example, a second router of the network-on-chip is to receive an indication of the mode of the channel from the first router and to configure a storage element of the second router based on the indication of the mode of the channel.

In at least one example, the second router is to further receive the data of the first data stream at an input of the storage element of the second router.

In at least one example, the clock signal is a stream signal that is to indicate a start of a transfer of a segment of the first data stream.

In at least one example, the entry of the linked list is to comprise direction information associated with the first data stream.

In at least one example, the logic is to determine that the mode is to be the circuit-switched mode unless a number of active data streams at a port associated with the storage element exceeds a threshold.

In at least one example, the threshold is one active data stream.

One or more embodiments may provide an apparatus, a system, a machine readable storage, a machine readable medium, hardware- and/or software-based logic (e.g., a router), a method, and a non-transitory machine readable medium including information to represent structures (when manufactured, to be configured) to receive a packet-switched reservation request to be associated with a first data stream, select a communication mode, the communication mode to be either a circuit-switched mode or a packet-switched mode, and communicate at least a portion of the first data stream in accordance with the communication mode.

In at least one example, the router is to select the circuit-switched mode when a port of the router has less than a threshold number of active data streams and is to select the packet-switched mode when the port of the router has a number of active data streams that is equal to or greater than the threshold number.

In at least one example, the router is further to disable data storage by a storage element of the router when the communication mode is circuit-switched and to enable the storage element to store data when the communication mode is packet-switched mode.

In at least one example, the communication mode is associated with a first port of the router and the router is further to select a second communication mode to be associated with a second port of the router, the communication mode to be either a circuit-switched mode or a packet-switched mode and communicate second data in accordance with the second communication mode.

One or more embodiments may provide an apparatus, a system, a machine readable storage, a machine readable medium, hardware- and/or software-based logic, a method, and a non-transitory machine readable medium including information to represent structures (when manufactured, to be configured) to comprise a plurality of cores each associated with a router of a network on a chip. A router is to comprise a plurality of port sets. A port set is to comprise an input port to receive a packet-switched channel reservation to reserve communication resources for a data stream; logic to determine a mode of a channel, the mode to be either a circuit-switched mode or a packet-switched mode; a storage element that is to pass data at an input of the storage element to an output of the storage element without storing the data when the channel is in the circuit-switched mode and store data at the input of the storage element when a clock signal is received when the channel is in the packet-switched mode; and an output port to provide data of the data stream to the input of the storage element and to send the output of the storage element to another router of the network on a chip.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor to comprise:
   a first router of a network-on-chip, the first router to comprise:
      an input port to receive a packet-switched channel reservation to reserve communication resources for a first data stream;
      logic to determine a mode of a channel, the mode to be either a circuit-switched mode or a packet-switched mode;
      a storage element that is to:
         pass data at an input of the storage element to an output of the storage element without storing the data when the channel is in the circuit-switched mode; and
         store data at the input of the storage element when a clock signal is received when the channel is in the packet-switched mode; and
      wherein the storage element is to receive data of the first data stream at the input of the storage element.

2. The processor of claim 1, wherein the storage element is associated with the input port.

3. The processor of claim 1, wherein the first router is to further comprise an output port and wherein the storage element is associated with the output port.

4. The processor of claim 1, wherein the storage element is to comprise at least one data latch.

5. The processor of claim 1, the first router to further comprise a linked list, an entry of the linked list to correspond to the first data stream.

6. The processor of claim 5, the linked list to further comprise a second entry to correspond to a second data stream.

7. The processor of claim 6, the first router to further comprise an output port to utilize the linked list to alternate between providing data from the first data stream to the input of the storage element and providing data from the second data stream to the input of the storage element.

8. The processor of claim 5, wherein the entry of the linked list is to comprise direction information associated with the first data stream.

9. The processor of claim 1, further comprising a second router of the network-on-chip, the second router to receive an indication of the mode of the channel from the first router and to configure a storage element of the second router based on the indication of the mode of the channel.

10. The processor of claim 9, the second router to further receive the data of the first data stream at an input of the storage element of the second router.

11. The processor of claim 1, wherein the clock signal is a stream signal that is to indicate a start of a transfer of a segment of the first data stream.

12. The processor of claim 1, wherein the logic is to determine that the mode is to be the circuit-switched mode unless a number of active data streams at a port associated with the storage element exceeds a threshold.

13. The processor of claim 12, wherein the threshold is one active data stream.

14. An apparatus to comprise:
   a router to:
      receive a packet-switched reservation request to be associated with a first data stream;

select a communication mode, the communication mode to be either a circuit-switched mode or a packet-switched mode; and communicate at least a portion of the first data stream in accordance with the communication mode;

wherein the router is to select the circuit-switched mode when a port of the router has less than a threshold number of active data streams and is to select the packet-switched mode when the port of the router has a number of active data streams that is equal to or greater than the threshold number.

15. The apparatus of claim 14, wherein the router is to select the circuit-switched mode when a port of the router has less than a threshold number of active data streams and is to select the packet-switched mode when the port of the router has a number of active data streams that is equal to or greater than the threshold number.

16. The apparatus of claim 14, wherein the router is further to disable data storage by a storage element of the router when the communication mode is circuit-switched and to enable the storage element to store data when the communication mode is packet-switched mode.

17. The apparatus of claim 14, wherein the communication mode is associated with a first port of the router and the router is further to:

select a second communication mode to be associated with a second port of the router, the communication mode to be either a circuit-switched mode or a packet-switched mode; and communicate second data in accordance with the second communication mode.

18. A non-transitory machine readable medium including information to represent structures, when manufactured, to be configured to:

receive a packet-switched reservation request to be associated with a first data stream;

select a communication mode, the communication mode to be either a circuit-switched mode or a packet-switched mode; and communicate at least a portion of the first data stream in accordance with the communication mode;

wherein the structures, when manufactured, are further configured to select the circuit-switched mode when a port of a router has less than a threshold number of active data streams and to select the packet-switched mode when the port of the router has a number of active data streams that is equal to or greater than the threshold number.

19. The medium of claim 18, the structures, when manufactured, to be further configured to select the circuit-switched mode when a port of a router has less than a threshold number of active data streams and is to select the packet-switched mode when the port of the router has a number of active data streams that is equal to or greater than the threshold number.

20. The medium of claim 18, the structures, when manufactured, to be further configured to disable data storage by a storage element of a router when the communication mode is circuit-switched and to enable the storage element to store data when the communication mode is packet-switched mode.

21. The medium of claim 20, wherein the communication mode is associated with a first port of a router and the structures, when manufactured, are to be further configured to:

select a second communication mode to be associated with a second port of the router, the communication mode to be either a circuit-switched mode or a packet-switched mode; and communicate second data in accordance with the second communication mode.

22. A system to comprise:

a plurality of cores each associated with a router of a network on a chip, a router to comprise:

a plurality of port sets; a port set to comprise:

an input port to receive a packet-switched channel reservation to reserve communication resources for a data stream;

logic to determine a mode of a channel, the mode to be either a circuit-switched mode or a packet-switched mode;

a storage element that is to:

pass data at an input of the storage element to an output of the storage element without storing the data when the channel is in the circuit-switched mode; and store data at the input of the storage element when a clock signal is received when the channel is in the packet-switched mode; and an output port to provide data of the data stream to the input of the storage element and to send the output of the storage element to another router of the network on a chip.

* * * * *